(12) United States Patent
Kim (10) Patent No.: US 11,035,461 B2
(45) Date of Patent: Jun. 15, 2021

(54) METHOD FOR PREVENTING INCORRECT LEARNING OF CLUTCH TORQUE OF TRANSMISSION OF VEHICLE

(71) Applicants: HYUNDAI MOTOR COMPANY, Seoul (KR); KIA MOTORS CORPORATION, Seoul (KR)

(72) Inventor: Jin Sung Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/508,714

(22) Filed: Jul. 11, 2019

(65) Prior Publication Data

US 2020/0309256 A1 Oct. 1, 2020

(30) Foreign Application Priority Data

Mar. 25, 2019 (KR) .................. 10-2019-0033850

(51) Int. Cl.
*F16H 59/14* (2006.01)
*F16H 61/00* (2006.01)
(Continued)

(52) U.S. Cl.
CPC ......... *F16H 61/0204* (2013.01); *B60W 10/02* (2013.01); *B60W 10/113* (2013.01);
(Continued)

(58) Field of Classification Search
CPC . F16D 2500/50287; F16D 2500/30425; F16D 2500/70252; F16D 2500/7082;
(Continued)

(56) References Cited

U.S. PATENT DOCUMENTS 8,798,889 B2   8/2014 Fujii et al.
9,285,284 B2 * 3/2016 Kim .................. F16D 48/06
(Continued)

FOREIGN PATENT DOCUMENTS

JP   H09-236137 A   9/1997
JP   2014-054862 A  3/2014
(Continued)

OTHER PUBLICATIONS

C. Canudas de Wit, et al., "A New Model for Control of Systems with Friction," IEEE Transactions on Automatic Control, vol. 40, No. 3, Mar. 1995, pp. 419-425.

*Primary Examiner* — Tisha D Lewis
(74) *Attorney, Agent, or Firm* — Morgan, Lewis & Bockius LLP (57) ABSTRACT

A method for preventing an incorrect learning of a clutch torque of a transmission of a vehicle may include a controller estimating an engine-based clutch torque estimated based on an engine torque; the controller estimating a wheel-based clutch torque estimated based on a driveshaft torsional torque; the controller determining a torque error, which is a difference between the engine-based clutch torque and the wheel-based clutch torque: the controller allowing a learning of the clutch torque when the torque error is equal to or less than a predetermined reference torque; and the controller prohibiting the learning of the clutch torque when the torque error is greater than the predetermined reference torque.

13 Claims, 5 Drawing Sheets

(51) Int. Cl.
*B60W 50/00* (2006.01)
*B60W 10/00* (2006.01)
*F16H 61/02* (2006.01)
*F16H 59/16* (2006.01)
*B60W 10/113* (2012.01)
*B60W 10/02* (2006.01)
*F16H 61/04* (2006.01)

(52) U.S. Cl.
CPC ....... *F16H 59/16* (2013.01); *F16H 2059/147* (2013.01); *F16H 2061/0087* (2013.01); *F16H 2061/0407* (2013.01); *F16H 2061/0459* (2013.01)

(58) Field of Classification Search
CPC ... B60W 2050/004; B60W 2510/0275; B60W 2710/027; F16H 2059/147; F16H 2059/148; F16H 2061/0087; F16H 2061/009
See application file for complete search history.

(56) References Cited

U.S. PATENT DOCUMENTS

| | | | |
|---|---|---|---|
| 9,353,806 B2* | 5/2016 | Kim | G01L 1/246 |
| 2012/0081051 A1* | 4/2012 | Kobayashi | B60K 6/48 |
| | | | 318/400.23 |
| 2012/0109477 A1* | 5/2012 | McDonnell | B60W 10/113 |
| | | | 701/68 |
| 2013/0096789 A1* | 4/2013 | McDonnell | B60W 10/06 |
| | | | 701/54 |
| 2016/0061319 A1* | 3/2016 | Fodor | B60W 30/18027 |
| | | | 701/60 |
| 2018/0172091 A1 | 6/2018 | Kim et al. | |
| 2018/0245689 A1 | 8/2018 | Araki et al. | |

FOREIGN PATENT DOCUMENTS

| | | |
|---|---|---|
| KR | 10-1558678 B1 | 10/2015 |
| KR | 10-1558689 B1 | 10/2015 |
| KR | 10-2016-0124527 A | 10/2016 |
| KR | 10-1755797 B1 | 7/2017 |

* cited by examiner

$$J_e \dot{\hat{\omega}}_e = T_{e0} + \hat{\delta}_e - \hat{\mu}_{c1} T_{tc1} - \hat{\mu}_{c2} T_{tc2}$$

$$J'_{c1} \dot{\hat{\omega}}_{c1} = \hat{\mu}_{c1} T_{tc1} + \frac{\gamma_T(\varphi_e)}{\gamma_T(\varphi_o)} \hat{\mu}_{c2} T_{tc2} - \frac{T_{so}(\hat{\omega}_{c1}, \hat{\omega}_w)}{\gamma_T(\varphi_o)}$$

$$J'_{c2} \dot{\hat{\omega}}_{c2} = \hat{\mu}_{c2} T_{tc2} + \frac{\gamma_T(\varphi_o)}{\gamma_T(\varphi_e)} \hat{\mu}_{c1} T_{tc1} - \frac{T_{se}(\hat{\omega}_{c2}, \hat{\omega}_w)}{\gamma_T(\varphi_e)}$$

$$J_v \dot{\hat{\omega}}_w = T_{sn}(\hat{\omega}_{ci}, \hat{\omega}_w) - T_L(\hat{\omega}_w)$$

FIG. 5

METHOD FOR PREVENTING INCORRECT LEARNING OF CLUTCH TORQUE OF TRANSMISSION OF VEHICLE

CROSS REFERENCE TO RELATED APPLICATION

The present application claims priority to Korean Patent Application No. 10-2019-0033850, filed Mar. 25, 2019, the entire contents of which is incorporated herein for all purposes by this reference.

BACKGROUND OF THE INVENTION

Field of the Invention

The present invention relates to a clutch of a transmission, and more particularly, to a technology of learning a clutch torque which is transferred by a dry clutch of a dual clutch transmission (DCT).

Description of Related Art

In a dual clutch transmission (DCT) using a dry clutch, a clutch is controlled by managing a relationship of a clutch torque to a stroke of a clutch actuator by a torque-stroke (T-S) curve and controlling the clutch by a controller to form the stroke of the clutch actuator corresponding to a desired clutch torque.

However, since the characteristics of the dry clutch continuously change by a temperature of the clutch, a wear state, a deformation of clutch related parts, and the like during running of a vehicle, the T-S curve continuously changes over time and it is difficult to directly measure the clutch torque by a sensor. Therefore, the controller configured for controlling the clutch learns the clutch torque as frequently as possible to ensure that a current clutch torque has a certain value as accurately as possible.

The clutch torque is learned by a method in which in a state in which the controller acquires a stroke of a clutch actuator for implementing a specific clutch torque from an existing T-S curve map and controls the clutch actuator with the stroke, the controller is configured to determine a torque transferred from the clutch, compares the determined torque with the specific clutch torque, and modifies the T-S curve map through an appropriate process according to a difference between the determined torque and the specific clutch torque.

Here, when the torque transferred from the clutch is determined, a model engine torque provided by an engine management system (EMS) which controls an engine is used. The model engine torque is not the torque which is output from an actual engine but is a value determined by the EMS from a steady state map or a model of an engine output torque with respect to an engine control amount such as a fuel amount and ignition timing. The model engine torque differs from the torque output from the actual engine because it does not properly reflect changes in loads generated by assistance equipment such as an air conditioner compressor and a generator driven by the engine, and differs from the torque which is output from the actual engine even when the engine is in a transient state.

Therefore, if the learning of the clutch torque is performed based on the model engine torque when the model engine torque significantly differs from the torque which is output from the actual engine, the learning of the clutch torque is performed erroneously, which may cause a shock at the time of departure or shifting of the vehicle, or cause a problem that the engine is turned off or the vehicle is unable to be accelerated.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for preventing an incorrect learning of a clutch torque of a transmission of a vehicle which may improve commerciality of the vehicle by preventing the incorrect learning of the clutch torque by preliminarily determining reliability of an engine torque used for learning the clutch torque of a dual clutch transmission (DCT) to thereby allow the learning of the clutch torque to be performed only when the reliability is a predetermined level or more and to prevent the learning of the clutch torque otherwise, ultimately further improving a departure performance and shifting quality of the vehicle through more accurate and stable control of the clutch.

According to an exemplary embodiment of the present invention, a method for preventing an incorrect learning of a clutch torque of a transmission of a vehicle may include: a controller estimating an engine-based clutch torque estimated based on an engine torque; the controller estimating a wheel-based clutch torque estimated based on a driveshaft torsional torque; the controller determining a torque error, which is a difference between the engine-based clutch torque and the wheel-based clutch torque; the controller allowing a learning of the clutch torque when the torque error is equal to or less than a predetermined reference torque; and the controller prohibiting the learning of the clutch torque when the torque error is greater than the predetermined reference torque.

The estimating of the wheel-based clutch torque may include: the controller inputting a model engine torque to a power train model; the controller inputting a target clutch torque of a first clutch and a target clutch torque of a second clutch to the power train model; the controller inputting shifting information related to a vehicle to the power train model; the controller feeding back an engine angular velocity error, which is a difference between a measured engine angular velocity and an estimated engine angular velocity determined from the power train model, a clutch angular velocity error of the first clutch, which is a difference between a measured clutch angular velocity of the first clutch and an estimated clutch angular velocity of the first clutch determined from the power train model, a clutch angular velocity error of a second clutch, which is a difference between a measured clutch angular velocity of the second clutch and an estimated clutch angular velocity of the second clutch determined from the power train model, and a wheel angular velocity error, which is a difference between a measured wheel angular velocity and an estimated wheel angular velocity determined from the power train model to the power train model and correcting the power train model in real time; and the controller determining the power train model and estimating a clutch torque of the first clutch and a clutch torque of the second clutch.

The power train model may include an engine model according to engine dynamics; a first clutch model and a second clutch model according to clutch dynamics; and a vehicle model according to vehicle dynamics.

The model engine torque may be input to the power train model together with the estimated engine torque error determined by cumulatively integrating the engine angular velocity error.

The target clutch torque of the first clutch may be multiplied by a clutch characteristic variable of the first clutch determined by a clutch frictional force characteristic model of the first clutch and be input to the power train model; and the target clutch torque of the second clutch may be multiplied by a clutch characteristic variable of the second clutch determined by a clutch frictional force characteristic model of the second clutch and be input to the power train model.

The engine model may be expressed as:

$$J_e \hat{\dot{\omega}}_e = T_{e0} + \hat{\delta}_e - \hat{\mu}_{c1} T_{tc1} - \hat{\mu}_{c2} T_{tc2}$$ wherein $J_e$: engine moment of inertia
$\hat{\dot{\omega}}_e$: estimated engine angular acceleration
$T_{e0}$: model engine torque
$\hat{\delta}_e$: estimated engine torque error
$\hat{\mu}_{c1}$: clutch characteristic variable of first clutch
$T_{tc1}$: target clutch torque of first clutch
$\hat{\mu}_{c1} T_{tc1}$: clutch torque of first clutch
$\hat{\mu}_{c2}$: clutch characteristic variable of second clutch
$T_{tc2}$: target clutch torque of second clutch, and
$\hat{\mu}_{c2} T_{tc2}$: clutch torque of second clutch.

The first clutch model may be expressed as:

$$J'_{c1} \hat{\dot{\omega}}_{c1} = \hat{\mu}_{c1} T_{tc1} + \frac{\gamma_T(\varphi_e)}{\gamma_T(\varphi_o)} \hat{\mu}_{c2} T_{tc2} - \frac{T_{so}(\hat{\omega}_{c1}, \hat{\omega}_w)}{\gamma_T(\varphi_o)}$$

wherein $J'_{c1}$: equivalent moment of inertia of first clutch
$\hat{\dot{\omega}}_{c1}$: estimated clutch angular acceleration of first clutch
$\hat{\mu}_{c1}$: clutch characteristic variable of first clutch
$T_{tc1}$: target clutch torque of first clutch
$\hat{\mu}_{c1} T_{tc1}$: clutch torque of first clutch
$\hat{\mu}_{c2}$: clutch characteristic variable of second clutch
$T_{tc2}$: target clutch torque of second clutch, and
$\hat{\mu}_{c2} T_{tc2}$: clutch torque of second clutch.
$\varphi_e$: even-numbered gear stages (e.g., second stage, fourth stage, sixth stage . . . )
$\varphi_o$: odd-numbered gear stages (e.g., first stage, third stage, fifth stage . . . )
$\gamma_T(\varphi_e)$: gear ratio in gear stage $\varphi_e$
$\gamma_T(\varphi_o)$: gear ratio in gear stage $\varphi_o$
$\hat{\omega}_w$: estimated wheel angular velocity
$T_{so}(\hat{\omega}_{c1}, \hat{\omega}_w)$: driveshaft torsional torque at the time of engaging odd-numbered stage, and $$T_{so}(\hat{\omega}_{c1}, \hat{\omega}_w) = \int_0^\tau k_s \left( \frac{\hat{\omega}_{c1}}{\gamma_T(\varphi_o)} - \hat{\omega}_w \right) d\tau - b_s \left( \frac{\hat{\omega}_{c1}}{\gamma_T(\varphi_o)} - \hat{\omega}_w \right)$$

$k_s$: rigidity coefficient of driveshaft
$b_s$: damping coefficient of driveshaft, and
$\hat{\omega}_{c1}$: estimated clutch angular velocity of first clutch.

The second clutch model may be expressed as:

$$J'_{c2} \hat{\dot{\omega}}_{c2} = \hat{\mu}_{c2} T_{tc2} + \frac{\gamma_T(\varphi_o)}{\gamma_T(\varphi_e)} \hat{\mu}_{c1} T_{tc1} - \frac{T_{se}(\hat{\omega}_{c2}, \hat{\omega}_w)}{\gamma_T(\varphi_e)}$$

wherein $J'_{c2}$: equivalent moment of inertia of second clutch
$\hat{\dot{\omega}}_{c2}$: estimated clutch angular acceleration of second clutch
$\hat{\mu}_{c1}$: clutch characteristic variable of first clutch
$T_{tc1}$: target clutch torque of first clutch
$\hat{\mu}_{c1} T_{tc1}$: clutch torque of first clutch
$\hat{\mu}_{c2}$: clutch characteristic variable of second clutch
$T_{tc2}$: target clutch torque of second clutch
$\hat{\mu}_{c2} T_{tc2}$: clutch torque of second clutch
$\varphi_e$: even-numbered gear stages (e.g., second stage, fourth stage, sixth stage . . . )
$\varphi_o$: odd-numbered gear stages (e.g., first stage, third stage, fifth stage . . . )
$\gamma_T(\varphi_e)$: gear ratio in gear stage $\varphi_e$
$\gamma_T(\varphi_o)$: gear ratio in gear stage $\varphi_o$
$\hat{\omega}_w$: estimated wheel angular velocity
$T_{se}(\hat{\omega}_{c2}, \hat{\omega}_w)$: driveshaft torsional torque at the time of engaging even-numbered stage, and $$T_{se}(\hat{\omega}_{c2}, \hat{\omega}_w) = \int_0^\tau k_s \left( \frac{\hat{\omega}_{c2}}{\gamma_T(\varphi_e)} - \hat{\omega}_w \right) d\tau - b_s \left( \frac{\hat{\omega}_{c2}}{\gamma_T(\varphi_e)} - \hat{\omega}_w \right)$$

$k_s$: rigidity coefficient of driveshaft
$b_s$: damping coefficient of driveshaft, and
$\hat{\omega}_{c2}$: estimated clutch angular velocity of second clutch.

The vehicle model may be expressed as:

$$J_v \hat{\dot{\omega}}_w = T_{sn}(\hat{\omega}_{ci}, \hat{\omega}_w) - T_L(\hat{\omega}_w)$$ wherein $J_v$: equivalent moment of inertia of vehicle
$\hat{\dot{\omega}}_w$: estimated wheel angular acceleration
$T_{sn}(\hat{\omega}_{ci}, \hat{\omega}_w)$: $T_{so}(\hat{\omega}_{c1}, \hat{\omega}_w)$ at the time of engaging odd-numbered stage, $T_{se}(\hat{\omega}_{c2}, \hat{\omega}_w)$ at the time of engaging even-numbered stage,
n=o or e, i=1 or 2;

$$T_{so}(\hat{\omega}_{c1}, \hat{\omega}_w) = \int_0^\tau k_s \left( \frac{\hat{\omega}_{c1}}{\gamma_T(\varphi_o)} - \hat{\omega}_w \right) d\tau - b_s \left( \frac{\hat{\omega}_{c1}}{\gamma_T(\varphi_o)} - \hat{\omega}_w \right)$$

$T_{so}$: driveshaft torsional torque at the time of engaging odd-numbered stage
$\hat{\omega}_{c1}$: estimated clutch angular velocity of first clutch
$\hat{\omega}_w$: estimated wheel angular velocity
$k_s$: rigidity coefficient of driveshaft
$b_s$: damping coefficient of driveshaft
$\omega_{c1}$: measured clutch angular velocity of first clutch
$\varphi_o$: odd-numbered gear stages (e.g., first stage, third stage, fifth stage . . . )
$\gamma_T(\varphi_o)$: gear ratio in gear stage $\varphi_o$ $$T_{se}(\hat{\omega}_{c2}, \hat{\omega}_w) = \int_0^\tau k_s \left( \frac{\hat{\omega}_{c2}}{\gamma_T(\varphi_e)} - \hat{\omega}_w \right) d\tau - b_s \left( \frac{\hat{\omega}_{c2}}{\gamma_T(\varphi_e)} - \hat{\omega}_w \right)$$

$T_{se}$: driveshaft torsional torque at the time of engaging even-numbered stage
$\hat{\omega}_{c2}$: estimated clutch angular velocity of second clutch
$\omega_{c2}$: measured clutch angular velocity of second clutch
$\varphi_e$: even-numbered gear stages (e.g., second stage, fourth stage, sixth stage . . . )
$\gamma_T(\varphi_e)$: gear ratio in gear stage $\varphi_e$, and
$T_L(\hat{\omega}_w)$: vehicle load.

The clutch frictional force characteristic model of the first clutch may be expressed as:

$$\hat{\mu}_{c1}(\hat{\omega}_{s1}, \hat{z}_{c1}) = \sigma_{c10}\hat{z}_{c1} + \sigma_{c11}\dot{\hat{z}}_{c1} + \sigma_{c12}\hat{\omega}_{s1} \text{ where,}$$

$$\hat{\omega}_{s1} = \hat{\omega}_e - \hat{\omega}_{c1},$$

$$\dot{\hat{z}}_{c1} = \hat{\omega}_{s1} - \sigma_{c10}\frac{|\hat{\omega}_{s1}|}{g(\hat{\omega}_{s1})}\hat{z}_{c1},$$

and $\hat{\mu}_{c1}$: clutch characteristic variable of first clutch
$\hat{\omega}_{s1}$: estimated clutch slip of first clutch
$\hat{\omega}_e$: estimated engine angular velocity
$\hat{\omega}_{c1}$: estimated clutch angular velocity of first clutch
$\sigma_{c10}$: rigidity coefficient for internal frictional force of first clutch
$\sigma_{c11}$: damping coefficient for internal frictional force of first clutch
$\sigma_{c12}$: damping coefficient for slip of first clutch
$z_{c1}$: internal variable for determining frictional force of first clutch and $\hat{z}_{c1}$: estimated value of $z_{c1}$.
$g(\hat{\omega}_{s1})$: frictional force according to slip of first clutch when change of $z_{c1}$ is 0 (normal stage)

$$g(\hat{\omega}_{s1}) = f_{c1c} + (f_{c1s} - f_{c1c})e^{-(\omega_{s1}/\omega_{cs})^2}$$

$f_{c1c}$: coefficient of kinetic friction of first clutch
$f_{c1s}$: coefficient of static friction of first clutch, and
$\omega_{cs}$: critical slip velocity (threshold velocity for distinguishing static friction and kinetic friction).

The clutch frictional force characteristic model of the second clutch may be expressed as:

$$\hat{\mu}_{c2}(\hat{\omega}_{s2}, \hat{z}_{c2}) = \sigma_{c20}\hat{z}_{c2} + \sigma_{c21}\dot{\hat{z}}_{c1} + \sigma_{c22}\hat{\omega}_{s2} \text{ where,}$$

$$\hat{\omega}_{s2} = \hat{\omega}_e - \hat{\omega}_{c2},$$

$$\dot{\hat{z}}_{c2} = \hat{\omega}_{s2} - \sigma_{c20}\frac{|\hat{\omega}_{s2}|}{g(\hat{\omega}_{s2})}\hat{z}_{c2},$$

and $\hat{\mu}_{c2}$: clutch characteristic variable of second clutch
$\hat{\omega}_{s2}$: estimated clutch slip of second clutch
$\hat{\omega}_e$: estimated engine angular velocity
$\hat{\omega}_{c2}$: estimated clutch angular velocity of second clutch
$\sigma_{c20}$: rigidity coefficient for internal frictional force of second clutch
$\sigma_{c21}$: damping coefficient for internal frictional force of second clutch
$\sigma_{c22}$: damping coefficient for slip of second clutch
$z_{c2}$: internal variable for determining frictional force of second clutch and $\hat{z}_{c2}$: estimated value of $z_{c2}$
$g(\hat{\omega}_{s2})$: frictional force according to slip of second clutch when change of $z_{c2}$ is 0 (normal stage)

$$g(\hat{\omega}_{s2}) = f_{c2c} + (f_{c2s} - f_{c2c})e^{-(\omega_{s2}/\omega_{cs})^2}$$

$f_{c2c}$: coefficient of kinetic friction of second clutch
$f_{c2s}$: coefficient of static friction of second clutch, and
$\omega_{cs}$: critical slip velocity (threshold velocity for distinguishing static friction and kinetic friction).

The reference torque may be set in consideration of the engine torque error, the clutch torque error, and the observer modeling error.

The reference torque may be set to a value obtained by adding an overcomable torque which is overcomable by the feedback control of the clutch torque to a root mean square of the engine torque error, the clutch torque error, and the observer modeling error.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
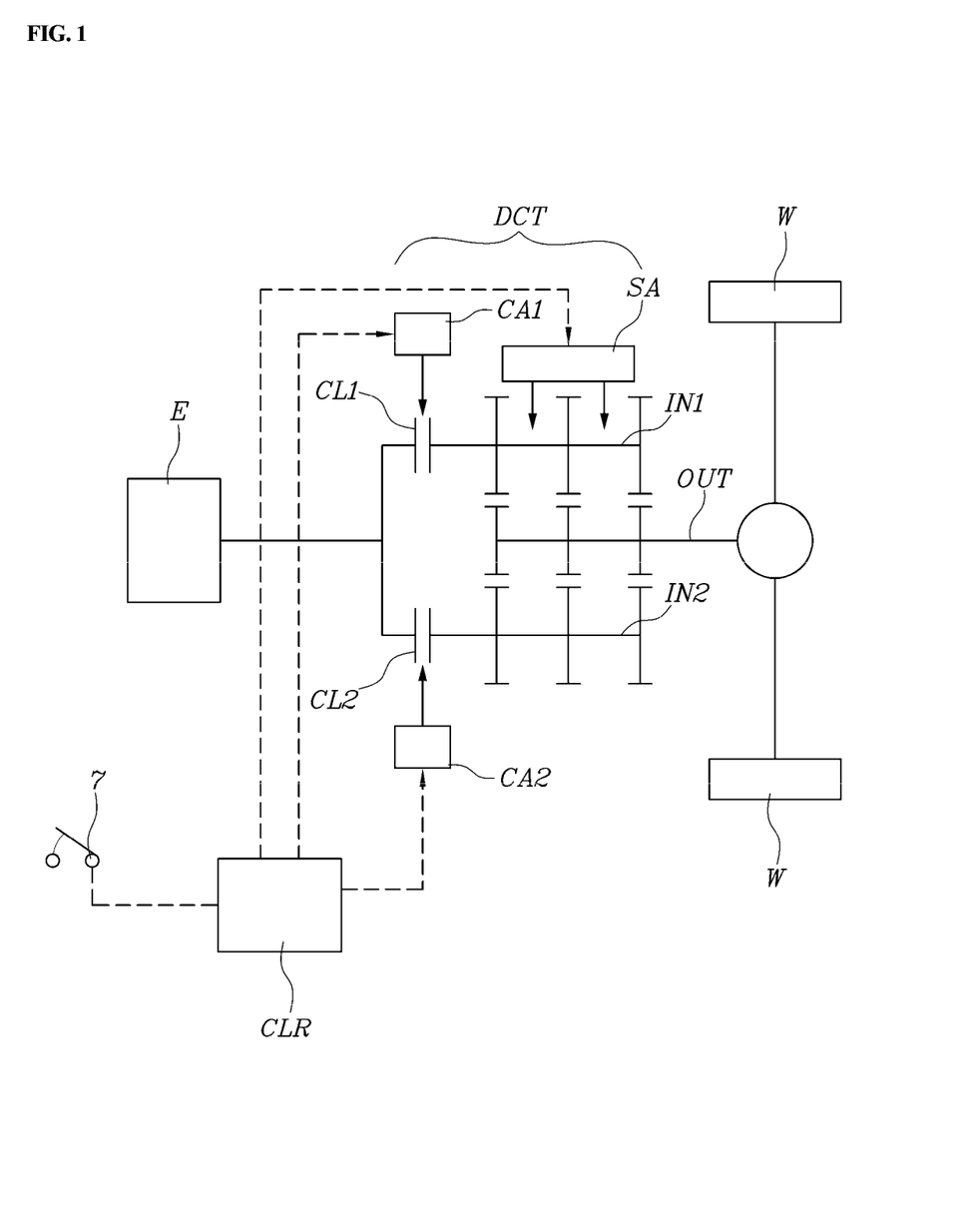
FIG. 1 is a schematic diagram of a DCT-provided vehicle to which the present invention may be applied.

FIG. 1 illustrates a configuration of a DCT-provided vehicle to which the present invention may be applied. Power of an engine E is transferred and is shifted to a first input shaft IN1 and a second input shaft IN2, respectively, of a dual clutch transmission (DCT) through a first clutch CL1 and a second clutch CL2, and is then supplied to driving wheels W through an output shaft OUT.

Furthermore, a clutch actuator CA1 of the first clutch and a clutch actuator CA2 of the second clutch for driving the first clutch CL1 and the second clutch CL2, respectively, and a shifting actuator SA for performing shifting with a selecting and shifting function are provided, and a controller CLR controls the clutch actuators CA1 and CA2, and the shifting actuator SA, automatically performing the shifting.

The controller CLR is configured to automatically perform a shifting of the dual-clutch transmission (DCT)

according to a driving situation of a Vehicle by receiving an actuation amount of an accelerator pedal of a driver through an accelerator position sensor (APS) 7 and receiving other information such as a speed and a torque of an engine and a vehicle speed to thereby control the clutch actuator CA1 of the first clutch, the clutch actuator CA2 of the second clutch, and the shifting actuator SA.

For example, when it is desired to implement the clutch torque of 50 Nm with the first clutch, the controller controls the first clutch to exert the clutch torque of 50 Nm by determining a stroke of the clutch actuator corresponding to 50 Nm from a T-S curve map which is provided for the first clutch in advance and controlling the clutch actuator to be driven by the stroke.

Meanwhile, the engine is controlled by a separate engine management system (EMS), and the controller CLR may communicate with the EMS to receive information on the engine.

For reference, the controller CLR as described above may be configured as a transmission management system (TMS). In some cases, the controller CLR may also be configured as an integrated control system that integrates the EMS and the TMS.

The DCT as described above implements odd-numbered shifting stages such as a first stage, a third stage, and a fifth stage among a series of shifting stages, and even-numbered shifting stages such as a second stage, a fourth stage, and a sixth stage through different input shafts and clutches. For example, the first clutch and the first input shaft implement the odd-numbered shifting stages and the second clutch and the second input shaft implement the even-numbered shifting stages so that the shifting is performed in a way in which the first clutch is released and the second clutch is engaged in a sequential shifting such as shifting from the third stage to the fourth stage, preventing torque interruption and ensuring smooth shifting feeling.

Here, a clutch which is released such as the first clutch at the time of shifting is referred to as a releasing clutch, and a clutch which is coupled such as the second clutch is referred to as a coupling clutch. Therefore, the input shaft connected to the releasing clutch is referred to as a releasing input shaft, and the input shaft connected to the coupling clutch is referred to as a coupling input shaft.

Figure 2:
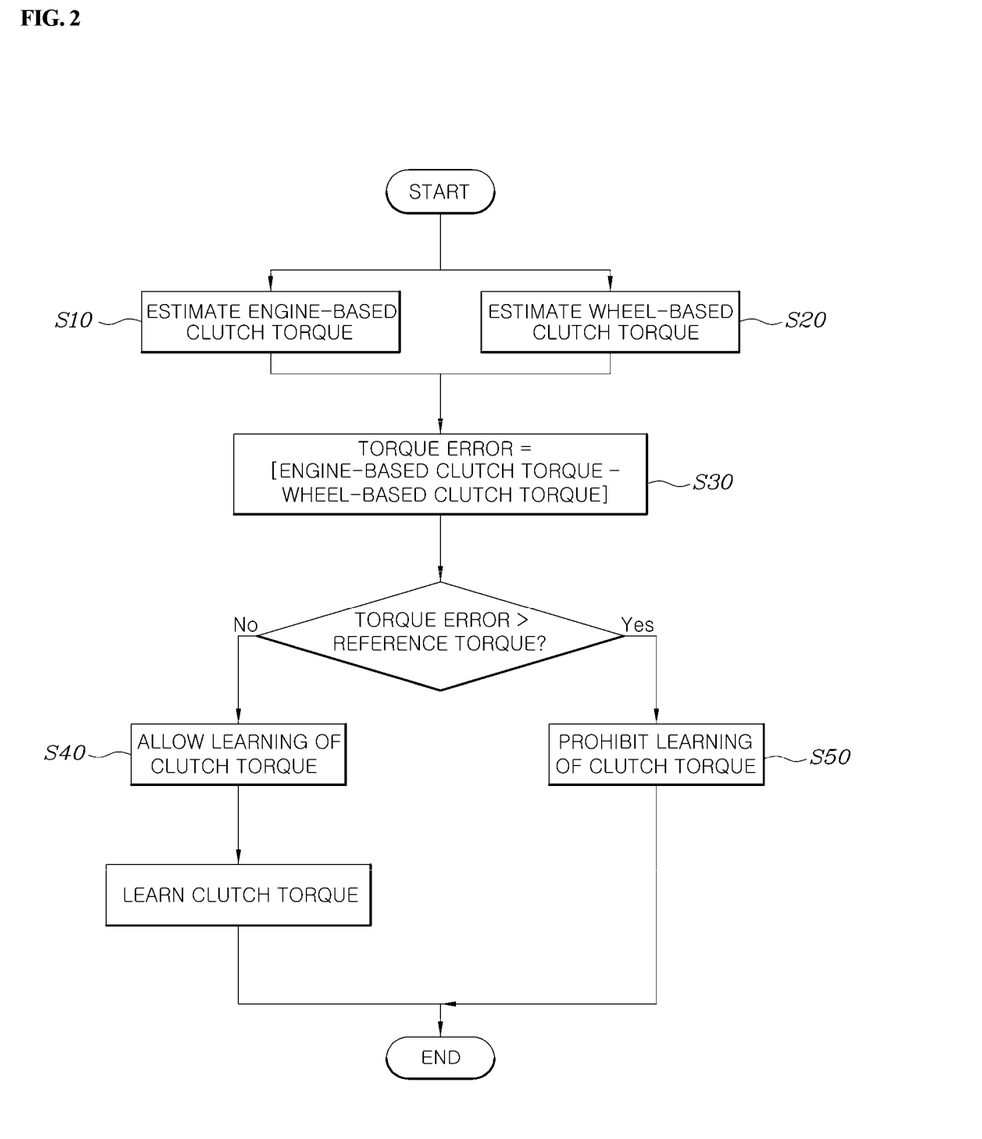
FIG. 2 is a flowchart illustrating an exemplary embodiment of a method for preventing an incorrect learning of a clutch torque of a transmission of a vehicle according to an exemplary embodiment of the present invention.

Referring to FIG. 2, a method for preventing an incorrect learning of a clutch torque of a transmission of a vehicle according to an exemplary embodiment of the present invention includes a controller estimating an engine-based clutch torque estimated based on an engine torque (S10); the controller estimating a wheel-based clutch torque estimated based on a driveshaft torsional torque (S20); the controller determining a torque error, which is a difference between the engine-based clutch torque and the wheel-based clutch torque (S30); the controller allowing a learning of the clutch torque when the torque error is equal to or less than a predetermined reference torque (S40); and the controller prohibiting the learning of the clutch torque when the torque error is greater than the predetermined reference torque (S50).

That is, according to an exemplary embodiment of the present invention, the engine-based clutch torque and the wheel-based clutch torque are separately estimated so that the learning of the clutch torque is allowed only when the difference between the two clutch torques is the reference torque or less, and the learning of the clutch torque is prohibited when the difference exceeds the reference torque to prevent the learning of the clutch torque from being performed based on an incorrect clutch torque. Accordingly, a learning result of the clutch torque having higher reliability is ensured and maintained and an accuracy of a clutch control is improved based on the learning result of the clutch torque having higher reliability, making it possible to ensure a better ride comfort of the vehicle at the time of departure controlling and shifting controlling of the vehicle.

Figure 5:
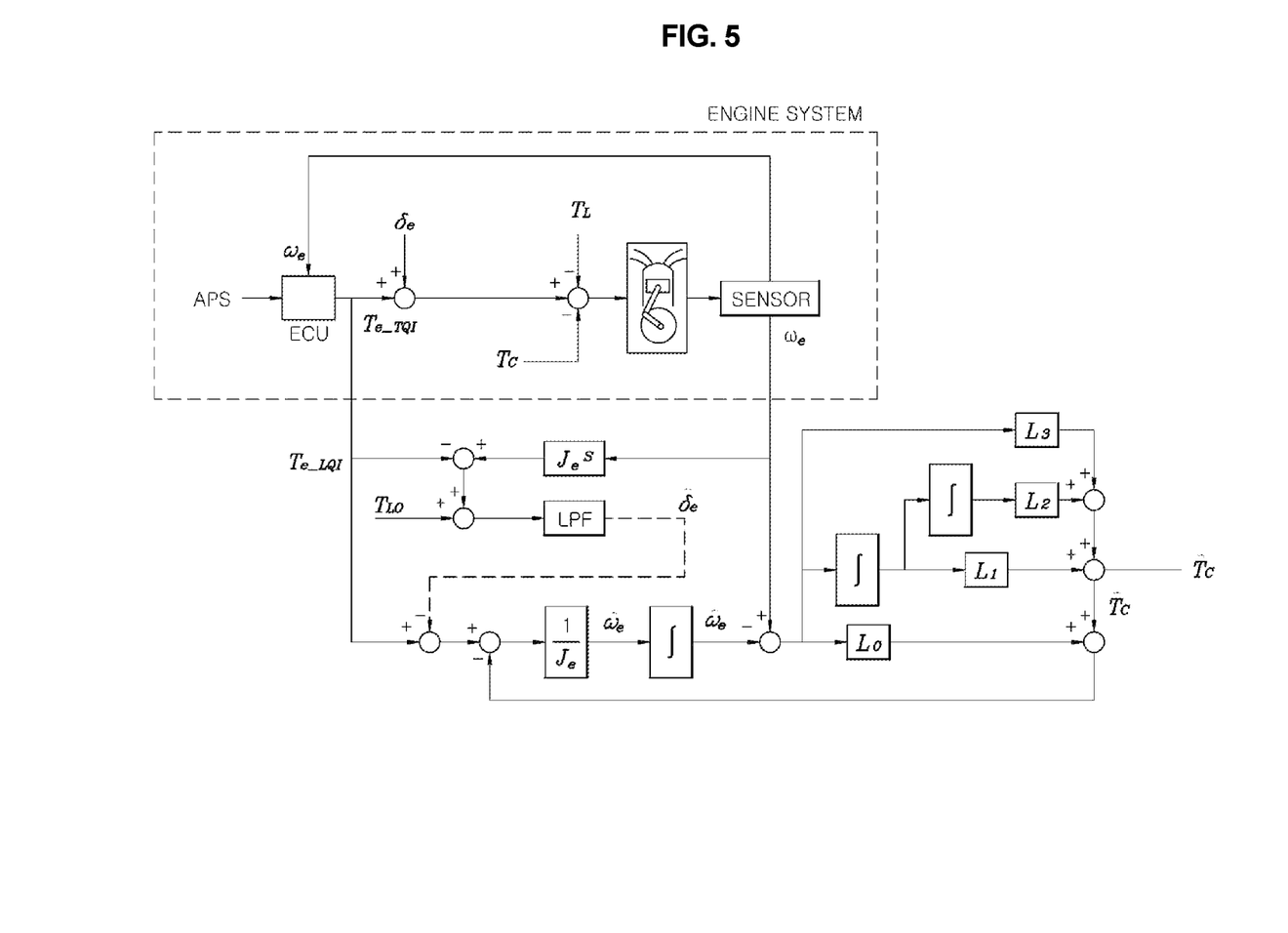
FIG. 5 is a conceptual diagram illustrating a method of estimating an engine-based clutch torque.

In estimating the engine-based clutch torque based on the engine torque, a conventional known technology may be used.

That is, the engine-based clutch torque may be estimated by a method included in Korean Patent No. 10-1558678 B1 or Korean Patent No. 10-1558689 B1. Therefore, FIG. 5 corresponds to FIG. 1 in Korean Patent No. 10-1558689 B1, an engine static torque (Te_TQI) in Korean Patent No. 10-1558689 B1 corresponds to a model engine torque ($T_{e0}$) mentioned In an exemplary embodiment of the present invention, and a clutch torque estimated value ($\hat{T}_c$) corresponds to the engine-based clutch torque In an exemplary embodiment of the present invention.

Furthermore, the learning of the clutch torque may be performed by use of any conventionally known method, and may be performed by using, for example, the method included in Korean Patent No. 10-1755797 B1, Korean Patent No. 10-1766116 B1, or the like.

Figure 3:
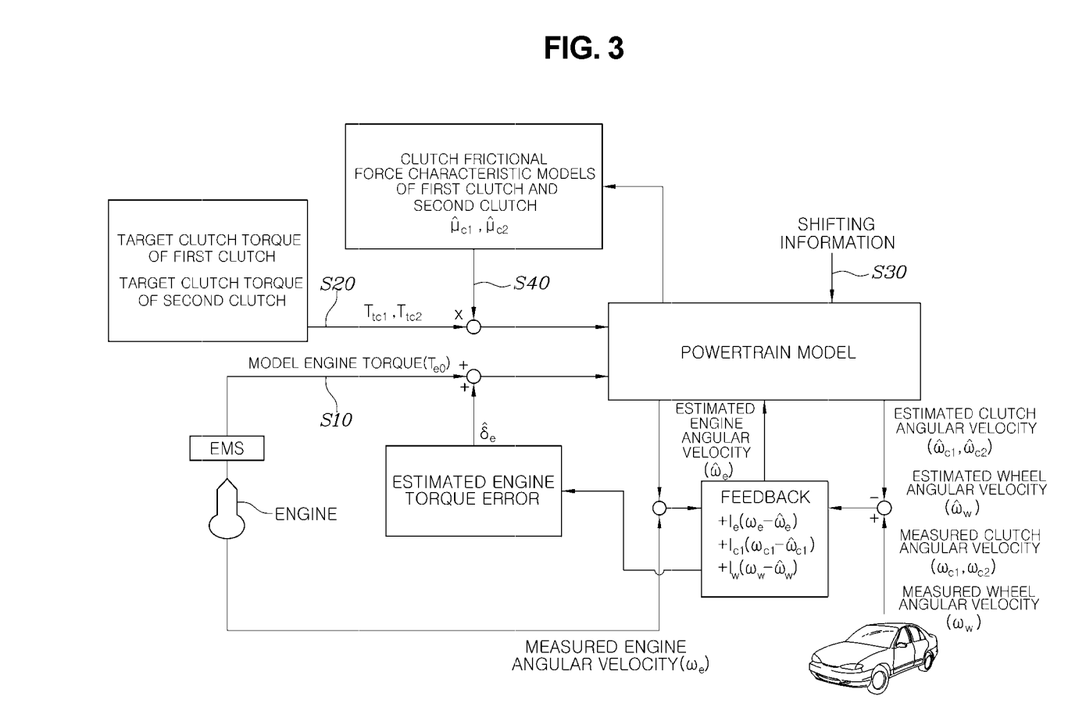
FIG. 3 is a conceptual diagram illustrating a method of estimating a wheel-based clutch torque.

In an exemplary embodiment of the present invention, the estimating of the wheel-based clutch torque includes the controller inputting a model engine torque to a power train model; the controller inputting a target clutch torque of a first clutch and a target clutch torque of a second clutch to the power train model; the controller inputting shifting information related to a vehicle to the power train model; the controller feeding back an engine angular velocity error, which is a difference between a measured engine angular velocity and an estimated engine angular velocity determined from the power train model, a clutch angular velocity error of the first clutch, which is a difference between a measured clutch angular velocity of the first clutch and an estimated clutch angular velocity of the first clutch determined from the power train model, a clutch angular velocity error of a second clutch, which is a difference between a measured clutch angular velocity of the second clutch and an estimated clutch angular velocity of the second clutch determined from the power train model, and a wheel angular velocity error, which is a difference between a measured wheel angular velocity and an estimated wheel angular velocity determined from the power train model to the power train model and correcting the power train model in real time; and the controller determining the power train model and estimating a clutch torque of the first clutch and a clutch torque of the second clutch.

For reference, the wheel-based clutch torque is determined by use of a driveshaft torsional torque in the power train mode as described later, and the driveshaft torsional torque was named to clearly distinguish it from the engine-based clutch torque in view of the fact that it may be seen as a torque substantially applied to the wheel.

Here, the clutch torque ($\hat{\mu}_{c1}T_{tc1}$) of the first clutch or the clutch torque ($\hat{\mu}_{c2}T_{tc2}$) of the second clutch corresponds to the wheel-based clutch torque. When the vehicle is driven by the clutch torque transferred by the first clutch, the wheel-based clutch torque corresponds to the clutch torque ($\hat{\mu}_{c1}T_{tc1}$) of the first clutch, and when the vehicle is driven by the clutch torque transferred by the second clutch, the wheel-based clutch torque corresponds to the clutch torque ($\hat{\mu}_{c2}T_{tc2}$) of the second clutch.

Figure 4:
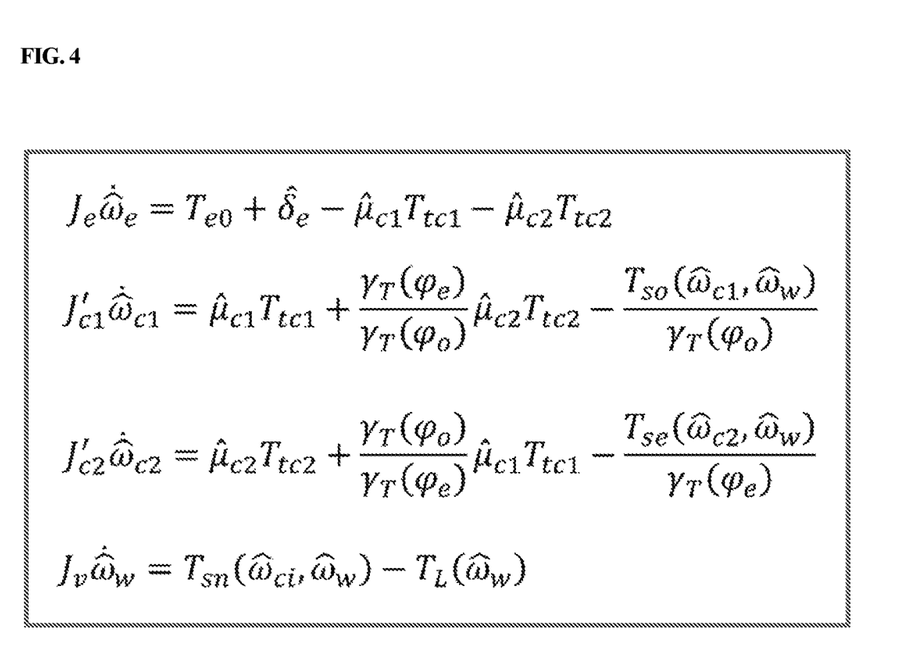
FIG. 4 is a diagram illustrating a power train of FIG. 3 in detail.

The power train model includes an engine model according to engine dynamics; a first clutch model and a second clutch model according to clutch dynamics; and a vehicle model according to vehicle dynamics.

That is, the power train model is corrected in real time by providing the power train model including the engine model, the first clutch model, the second clutch model, and the vehicle model as described above, and feeding back the engine angular velocity error, the clutch angular velocity error of the first clutch, the clutch angular velocity error of the second clutch, and the wheel angular velocity error to the power train model while inputting the model engine torque, the target clutch torque of the first clutch, the target clutch torque of the second clutch, and the shifting information related to the vehicle to the power train model, and the clutch torque of the first clutch and the clutch torque of the second clutch are estimated from the power train model.

By use of the power train model including the engine model, the first clutch model, the second clutch model, and the vehicle model described above in estimating the clutch torque of the first clutch and the clutch torque of the second clutch as described above, the clutch torque of the first clutch and the clutch torque of the second clutch are estimated based on information on the vehicle driving states more than the engine-based clutch torque determined based on the model engine torque, making it possible to perform a more accurate estimation than the engine-based clutch torque.

For reference, the measurement engine angular velocity may be measured by a crank angle sensor or the like, the measurement clutch angular velocity of the first clutch may be measured by a sensor that measures a rotation speed of a first input shaft connected to the first clutch, the measurement clutch angular velocity of the second clutch may be measured by a sensor provided to measure a rotation speed of a second input shaft connected to the second clutch, and the measurement wheel angular velocity may be measured by a wheel speed sensor mounted on the wheel of the vehicle.

The model engine torque is provided to the controller from the EMS and refers to a torque which is expected to be output from the engine depending on an fuel amount, an ignition timing, and the like controlled by the EMS according to the vehicle state such as APS signal according to the driver's accelerator pedal operation state.

That is, the model engine torque is not an actual engine torque, but is an engine torque which is determined by the EMS from a map or a model of the engine output torque with respect to the engine control amount such as the fuel amount and the ignition timing and is transferred to the controller through controller area network (CAN) communication.

The model engine torque is input to the power train model together with the estimated engine torque error determined by cumulatively integrating the engine angular velocity error.

That is, the model engine torque may differ from the actual engine torque, so that the difference is compensated for by the estimated engine torque error to reflect a more realistic engine torque to the engine model of the power train model.

The estimated engine torque error may be determined by the following Equation 1.

$$\hat{\delta}_e = \int_0^t l_{ei}(\omega_e - \hat{\omega}_e) d\tau \quad \text{[Equation 1]}$$

where, $\hat{\delta}_e$: estimated engine torque error
$\omega_e$: measured engine angular velocity
$\hat{\omega}_e$: estimated engine angular velocity
$l_{ei}$: feedback gain for engine angular velocity error Meanwhile, the engine model configuring the power train model may be expressed by the following Equation 2.

$$J_e \dot{\hat{\omega}}_e = T_{e0} + \hat{\delta}_e - \hat{\mu}_{c1} T_{tc1} - \hat{\mu}_{c2} T_{tc2} \text{ where,} \quad \text{[Equation 2]}$$

$J_e$: engine moment of inertia
$\dot{\hat{\omega}}_e$: estimated engine angular acceleration
$T_{e0}$: model engine torque
$\hat{\delta}_e$: estimated engine torque error
$\hat{\mu}_{c1}$: clutch characteristic variable of first clutch
$T_{tc1}$: target clutch torque of first clutch
$\hat{\mu}_{c1} T_{tc1}$: clutch torque of first clutch
$\hat{\mu}_{c2}$: clutch characteristic variable of second clutch
$T_{tc2}$: target clutch torque of second clutch
$\hat{\mu}_{c2} T_{tc2}$: clutch torque of second clutch.

Here, expressing that the engine angular velocity error is fed back to the engine model and corrected in real time, it may be expressed by Equation 3 below.

$$J_e \dot{\hat{\omega}}_e = T_{e0} + \hat{\delta}_e - \hat{\mu}_{c1} T_{tc1} - \hat{\mu}_{c2} T_{tc2} + l_e(\omega_e - \hat{\omega}_e) \quad \text{[Equation 3]}$$

where, $\omega_e$: measured engine angular velocity
$\hat{\omega}_e$: estimated engine angular velocity
$l_e$: observer feedback gain for engine angular velocity error
$\omega_e - \hat{\omega}_e$: engine angular velocity error.

The controller feeding back the engine angular velocity error to the engine model and correcting the engine angular velocity error is based on the fact that a difference is gradually decreased so that the engine model becomes closer to the actual engine dynamics, when the difference is multiplied by an appropriate observer feedback gain and repeatedly determined, under a theoretical assumption that the difference between the measured engine angular velocity which is actually measured and the estimated engine angular velocity determined in the model reflects the difference between the engine model and the actual engine dynamics.

For reference, according to an exemplary embodiment of the present invention, $\hat{\mu}_{c1} T_{tc1}$, which is the clutch torque of the first clutch, and $\hat{\mu}_{c2} T_{tc2}$, which is the clutch torque of the second clutch are estimated in Equation above and are set to the wheel-based clutch torque as described above, and the wheel-based clutch torque is compared with the engine-based clutch torque, determining whether or not the learning of the clutch torque is performed.

In a case in which the learning of the clutch torque is prohibited as a result of the determination of whether or not the learning of the clutch torque is performed as described above, a conventional learning value of the clutch torque is used as it is, and after the learning of the clutch torque is allowed and the learning of the clutch torque is performed, the control of the first clutch and the second clutch is performed using the result of the learning.

The target clutch torque of the first clutch is multiplied by the clutch characteristic variable of the first clutch determined by a clutch frictional force characteristic model of the first clutch and is input to the power train model.

Furthermore, the target clutch torque of the second clutch is multiplied by the clutch characteristic variable of the second clutch determined by a clutch frictional force characteristic model of the second clutch and is input to the power train model.

The first clutch model may be expressed by Equation 4 below.

$$J'_{c1}\dot{\hat{\omega}}_{c1} = \hat{\mu}_{c1}T_{tc1} + \frac{\gamma_T(\varphi_e)}{\gamma_T(\varphi_o)}\hat{\mu}_{c2}T_{tc2} - \frac{T_{so}(\hat{\omega}_{c1},\hat{\omega}_w)}{\gamma_T(\varphi_o)} \quad \text{[Equation 4]}$$

where, $J'_{c1}$: equivalent moment of inertia of first clutch $\dot{\hat{\omega}}_{c1}$: estimated clutch angular acceleration of first clutch $\hat{\mu}_{c1}$: clutch characteristic variable of first clutch $T_{tc1}$: target clutch torque of first clutch $\hat{\mu}_{c1}T_{tc1}$: clutch torque of first clutch $\hat{\mu}_{c2}$: clutch characteristic variable of second clutch $T_{tc2}$: target clutch torque of second clutch $\hat{\mu}_{c2}T_{tc2}$: clutch torque of second clutch $\varphi_e$: even-numbered gear stages (e.g., second stage, fourth stage, sixth stage . . . )

$\varphi_o$: odd-numbered gear stages (e.g., first stage, third stage, fifth stage . . . )

$\gamma_T(\varphi_e)$: gear ratio in gear stage $\varphi_e$ $\gamma_T(\varphi_o)$: gear ratio in gear stage $\varphi_o$ $\hat{\omega}_w$: estimated wheel angular velocity $T_{so}(\hat{\omega}_{c1},\hat{\omega}_w)$: Driveshaft torsional torque at the time of engaging odd-numbered stage, and $$T_{so}(\hat{\omega}_{c1},\hat{\omega}_w) = \int_0^t k_s\left(\frac{\hat{\omega}_{c1}}{\gamma_T(\varphi_o)} - \hat{\omega}_w\right)d\tau - b_s\left(\frac{\hat{\omega}_{c1}}{\gamma_T(\varphi_o)} - \hat{\omega}_w\right)$$

$k_s$: rigidity coefficient of driveshaft $b_s$: damping coefficient of driveshaft $\hat{\omega}_{c1}$: estimated clutch angular velocity of first clutch.

Here, expressing that the clutch angular velocity error of the first clutch is fed back to the first clutch model and corrected in real time, it may be expressed by Equation 5 below.

$$J'_{c1}\dot{\hat{\omega}}_{c1} = \quad \text{[Equation 5]}$$
$$\hat{\mu}_{c1}T_{tc1} + \frac{\gamma_T(\varphi_e)}{\gamma_T(\varphi_o)}\hat{\mu}_{c2}T_{tc2} - \frac{T_{so}(\hat{\omega}_{c1},\hat{\omega}_w)}{\gamma_T(\varphi_o)} + 1_{c1}(\omega_{c1} - \hat{\omega}_{c1})$$

where, $\omega_{c1}$: measured clutch angular velocity of first clutch $1_{c1}$: observer feedback gain for clutch angular velocity error of first clutch $\omega_{c1} - \hat{\omega}_{c1}$: clutch angular velocity error of first clutch.

The controller feeding back the clutch angular velocity error of the first clutch to the first clutch model and correcting the clutch angular velocity error is based on the fact that a difference is gradually decreased so that the first clutch model becomes closer to the actual first clutch dynamics, when the difference is multiplied by an appropriate observer feedback gain and repeatedly determined, under a theoretical assumption that the difference between the measured clutch angular velocity of the first clutch which is actually measured and the estimated clutch angular velocity determined in the first clutch model reflects the difference between the first clutch model and the actual first clutch dynamics.

Meanwhile, the second clutch model may be expressed by Equation 6 below.

$$J'_{c2}\dot{\hat{\omega}}_{c2} = \hat{\mu}_{c2}T_{tc2} + \frac{\gamma_T(\varphi_o)}{\gamma_T(\varphi_e)}\hat{\mu}_{c1}T_{tc1} - \frac{T_{se}(\hat{\omega}_{c1},\hat{\omega}_w)}{\gamma_T(\varphi_e)} \quad \text{[Equation 6]}$$

where, $J'_{c2}$: equivalent moment of inertia of second clutch $\dot{\hat{\omega}}_{c2}$: estimated clutch angular acceleration of second clutch $\hat{\mu}_{c1}$: clutch characteristic variable of first clutch $T_{tc1}$: target clutch torque of first clutch $\hat{\mu}_{c1}T_{tc1}$: clutch torque of first clutch $\hat{\mu}_{c2}$: clutch characteristic variable of second clutch $T_{tc2}$: target clutch torque of second clutch $\hat{\mu}_{c2}T_{tc2}$: clutch torque of second clutch $\varphi_e$: even-numbered gear stages (e.g., second stage, fourth stage, sixth stage . . . )

$\varphi_o$: odd-numbered gear stages (e.g., first stage, third stage, fifth stage . . . )

$\gamma_T(\varphi_e)$: gear ratio in gear stage $\varphi_e$ $\gamma_T(\varphi_o)$: gear ratio in gear stage $\varphi_o$ $\hat{\omega}_w$: estimated wheel angular velocity $T_{se}(\hat{\omega}_{c2},\hat{\omega}_w)$: driveshaft torsional torque at the time of engaging even-numbered stage, and $$T_{se}(\hat{\omega}_{c2},\hat{\omega}_w) = \int_0^t k_s\left(\frac{\hat{\omega}_{c2}}{\gamma_T(\varphi_e)} - \hat{\omega}_w\right)d\tau - b_s\left(\frac{\hat{\omega}_{c2}}{\gamma_T(\varphi_e)} - \hat{\omega}_w\right)$$

$k_s$: rigidity coefficient of driveshaft $b_s$: damping coefficient of driveshaft $\hat{\omega}_{c2}$: estimated clutch angular velocity of second clutch.

Here, expressing that the clutch angular velocity error of the second clutch is fed back to the second clutch model and corrected in real time, it may be expressed by Equation 7 below.

$$J'_{c2}\dot{\hat{\omega}}_{c2} = \quad \text{[Equation 7]}$$
$$\hat{\mu}_{c2}T_{tc2} + \frac{\gamma_T(\varphi_o)}{\gamma_T(\varphi_e)}\hat{\mu}_{c1}T_{tc1} - \frac{T_{se}(\hat{\omega}_{c2},\hat{\omega}_w)}{\gamma_T(\varphi_e)} + l_{c2}(\omega_{c2} - \hat{\omega}_{c2})$$

where, $\omega_{c2}$: measured clutch angular velocity of second clutch $l_{c2}$: observer feedback gain for clutch angular velocity error of second clutch $\omega_{c2} - \hat{\omega}_{c2}$: clutch angular velocity error of second clutch.

The controller feeding back the clutch angular velocity error of the second clutch to the second clutch model and correcting the clutch angular velocity error is based on the fact that a difference is gradually decreased so that the second clutch model becomes closer to the actual second clutch dynamics, when the difference is multiplied by an appropriate observer feedback gain and repeatedly determined, under a theoretical assumption that the difference between the measured clutch angular velocity of the second clutch which is actually measured and the estimated clutch angular velocity determined in the second clutch model reflects the difference between the second clutch model and the actual second clutch dynamics.

The clutch frictional force characteristic model of the first clutch may be expressed by Equation 8 below.

$$\hat{\mu}_{c1}(\hat{\omega}_{s1}, \hat{z}_{c1}) = \sigma_{c10}\hat{z}_{c1} + \sigma_{c11}\dot{\hat{z}}_{c1} + \sigma_{c12}\hat{\omega}_{s1} \quad \text{[Equation 8]}$$

where, $$\hat{\omega}_{s1} = \hat{\omega}_e - \hat{\omega}_{c1},$$

$$\dot{\hat{z}}_{c1} = \hat{\omega}_{s1} - \sigma_{c10}\frac{|\hat{\omega}_{s1}|}{g(\hat{\omega}_{s1})}\hat{z}_{c1},$$

and $\hat{\mu}_{c1}$: clutch characteristic variable of first clutch
$\hat{\omega}_{s1}$: estimated clutch slip of first clutch
$\hat{\omega}_e$: estimated engine angular velocity
$\hat{\omega}_{c1}$: estimated clutch angular velocity of first clutch
$\sigma_{c10}$: rigidity coefficient for internal frictional force of first clutch
$\sigma_{c11}$: damping coefficient for internal frictional force of first clutch
$\sigma_{c12}$: damping coefficient for slip of first clutch
$z_{c1}$: internal variable for determining frictional force of first clutch and $\hat{z}_{c1}$: estimated value $z_{c1}$.
$g(\hat{\omega}_{s1})$: frictional force according to slip of first clutch when change of $z_{c1}$ is 0 (normal stage)

$$g(\hat{\omega}_{s1}) = f_{c1c} + (f_{c1s} - f_{c1c})e^{-(\omega_{s1}/\omega_{cs})^2}$$

$f_{c1c}$: coefficient of kinetic friction of first clutch
$f_{c1s}$: coefficient of static friction of first clutch
$\omega_{cs}$: critical slip velocity (threshold velocity for distinguishing static friction and kinetic friction).

Furthermore, the clutch frictional force characteristic model of the second clutch may be expressed, by Equation 9 below.

$$\hat{\mu}_{c2}(\hat{\omega}_{s2}, \hat{z}_{c2}) = \sigma_{c20}\hat{z}_{c2} + \sigma_{c21}\dot{\hat{z}}_{c2} + \sigma_{c22}\hat{\omega}_{s2} \quad \text{[Equation 9]}$$

where, $$\hat{\omega}_{s2} = \hat{\omega}_e - \hat{\omega}_{c2},$$

$$\dot{\hat{z}}_{c2} = \hat{\omega}_{s2} - \sigma_{c20}\frac{|\hat{\omega}_{s2}|}{g(\hat{\omega}_{s2})}\hat{z}_{c2},$$

and $\hat{\mu}_{c2}$: clutch characteristic variable of second clutch
$\hat{\omega}_{s2}$: estimated clutch slip of second clutch
$\hat{\omega}_e$: estimated engine angular velocity
$\hat{\omega}_{c2}$: estimated clutch angular velocity of second clutch
$\sigma_{c20}$: rigidity coefficient for internal frictional force of second clutch
$\sigma_{c21}$: damping coefficient for internal frictional force of second clutch
$\sigma_{c22}$: damping coefficient for slip of second clutch
$z_{c2}$: internal variable for determining frictional force of second clutch and $\hat{z}_{c2}$: estimated value of $z_{c2}$
$g(\hat{\omega}_{s2})$: frictional force according to slip of second clutch when change of $z_{c2}$ is 0 (normal stage)

$$g(\hat{\omega}_{s2}) = f_{c2c} + (f_{c2s} - f_{c2c})e^{-(\omega_{s2}/\omega_{cs})^2}$$

$f_{c2c}$: coefficient of kinetic friction of second clutch
$f_{c2s}$: coefficient of static friction of second clutch
$\omega_{cs}$: critical slip velocity (threshold velocity for distinguishing static friction and kinetic friction).

In a case in which the clutch characteristic variable $\hat{\mu}_{c1}$ of the first clutch and the clutch characteristic variable $\hat{\mu}_{c2}$ of the second clutch determined and obtained as described above are collectively referred to as $\mu$, if $\mu=1$, this means that the clutch is engaged as much as desired and the target clutch torque input by the controller is equal to the clutch torque estimated by the power train model, if $\mu<1$, this means UNDER ENGAGE in which the clutch is engaged less than the target, and if $\mu>1$, this means OVER ENGAGE in which the clutch is engaged more than the target.

For reference, the clutch frictional, force characteristic models of the first clutch and the second clutch are referred to a reference document (C. Canudas de Wit, H. Olsson, K. J. Astrom, P. Lischinsky, "A new model for control of systems with friction", IEEE Transaction on Automatic Control, Vol. 40, No. 3, 1995).

Meanwhile, the vehicle model may be expressed by Equation 10 below.

$$J_v\dot{\hat{\omega}}_w = T_{sn}(\hat{\omega}_{ci},\hat{\omega}_w) - T_L(\hat{\omega}_w) \text{ where,} \quad \text{[Equation 10]}$$

$J_v$: equivalent moment of inertia of vehicle
$\dot{\hat{\omega}}_w$: estimated wheel angular acceleration
$T_{sn}(\hat{\omega}_{ci}, \hat{\omega}_w)$: $T_{so}(\hat{\omega}_{c1},\hat{\omega}_w)$ at the time of engaging odd-numbered stage, $T_{se}(\hat{\omega}_{c2},\hat{\omega}_w)$ at the time of engaging even-numbered stage,
n=o or e, i=1 or 2;
$T_L(\hat{\omega}_w)$: vehicle load
$\hat{\omega}_w$: estimated wheel angular velocity.

Here, expressing that the wheel angular velocity error of the vehicle is fed back to the vehicle model and corrected in real time, it may be expressed by Equation 11 below.

$$J_v\dot{\hat{\omega}}_w = T_{sn}(\hat{\omega}_{ci},\hat{\omega}_w) - T_L(\hat{\omega}_w) + l_w(\omega_w - \hat{\omega}_w) \text{ where,} \quad \text{[Equation 11]}$$

$\omega_w$: measured wheel angular velocity
$l_w$: observer feedback gain for wheel angular velocity error of vehicle.

Here, the vehicle load $T_L$ may be determined by Equation 12 below.

$$T_L(\hat{\omega}_w) = r_w(K_r M_v g \cos\theta_r - \tfrac{1}{2}\rho C_d A_F r_w^2 \hat{\omega}_w^2 - M_v g \sin\theta_r) \quad \text{[Equation 12]}$$

where,
$r_w$: wheel dynamic load radius of vehicle
$K_r$: rolling resistance coefficient
$M_v$: mass of vehicle
g: acceleration of gravity
$\theta_r$: inclination angle of driving road
$\rho$: density of air
$C_d$: air resistance coefficient
$A_F$: front projection area of vehicle.

For reference, the shifting information input to the power train model by the controller is used for the first clutch model, the second clutch model, and the vehicle model, as described above.

In the controller determining the power train model and estimating the clutch torque of the first clutch and the clutch torque of the second clutch, the engine model, the first clutch model, the second clutch model, and the vehicle model are determined by a method such as numerical integration or the like so that the clutch torque of the first clutch and the clutch torque of the second clutch may be estimated.

Meanwhile, the reference torque is set in consideration of the engine torque error, the clutch torque error, and the observer modeling error.

For example, the reference torque may be set to a value obtained by adding an overcomable torque which may be overcome by the feedback control of the clutch torque to a root mean square of the engine torque error, the clutch torque error, and the observer modeling error, and may be determined by Equation 13 below.

Reference Torque=RMS(engine torque error,clutch torque error,observer torque error)+Overcomable Torque  [Equation 13]

where RMS( ) means a function of a root mean square.

The engine torque error is to consider a difference between the model engine torque output from the EMS and the actual engine torque, and it is preferable to set the engine torque error in consideration of a maximum value of a change in the engine torque consumed by assistance equipment of the engine, a maximum value of a change in the engine torque according to a deviation between products of each engine, a maximum value of a change in the engine torque generated between a state measured by an engine dynamometer and a state mounted in the actual vehicle, and the like.

It is preferable to set the clutch torque error in consideration of a maximum value of a T-S curve model error, a maximum value of a change in the clutch torque at the time of experimenting the clutch and mounting the clutch in the actual vehicle, a maximum value of a change in the clutch torque according to a deviation between the products of each clutch, and the like.

It is preferable to set the observer modeling error in consideration of a maximum value of a torque difference which may be caused by failing to accurately reflect the vehicle load such as a weight of the vehicle and a road gradient to the power train model, a maximum value of a torque difference which may be caused by imperfections of the power train model itself and numerical errors due to discrete signal processing, a maximum value of a torque difference due to a feedback limit due to the noise of various sensor measured values used in the power train model, and the like.

Meanwhile, the overcomable torque is set to prevent an adverse effect of prohibiting excessive learning of the clutch torque if the clutch torque may be easily overcome through the feedback control when the controller controls the clutch torque. For example, the overcomable torque may be set to about ±10 Nm.

Furthermore, the reference torque including the overcomable torque as described above may be set to, for example, about 20 Nm.

As described above, according to an exemplary embodiment of the present invention, the engine-based clutch torque which may be determined based on the model engine torque by the conventional technology is compared with the wheel-based clutch torque determined based on the driveshaft torsional torque in real time, and the learning of the clutch torque is prohibited when the difference exceeds the reference torque to prevent inaccurate learning of the clutch torque, improving a learning value of the clutch torque and obtaining a more improved driving quality in a situation such as departure and shifting of the vehicle due to an improvement in accuracy of the clutch control based on the improved reliability of the learning value of the clutch torque.

Of course, when the learning of the clutch torque is allowed and performed, the learning of the clutch torque is performed by updating the T-S curve, for example.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for preventing an incorrect learning of a clutch torque of a transmission of a vehicle, the method comprising:
   estimating, by a controller, an engine-based clutch torque estimated based on an engine torque;
   estimating, by the controller, a wheel-based clutch torque estimated based on a driveshaft torsional torque;
   determining, by the controller, a torque error, which is a difference between the engine-based clutch torque and the wheel-based clutch torque;
   allowing, by the controller, a learning of the clutch torque when the torque error is equal to or less than a predetermined reference torque; and
   prohibiting, by the controller, the learning of the clutch torque when the torque error is greater than the predetermined reference torque.

2. The method of claim 1, wherein the estimating of the wheel-based clutch torque includes:
   inputting, by the controller, a model engine torque to a power train model;
   inputting, by the controller, a target clutch torque of a first clutch and a target clutch torque of a second clutch to the power train model;
   inputting, by the controller, shifting information related to a vehicle to the power train model;
   feeding back, by the controller, an engine angular velocity error, which is a difference between a measured engine angular velocity and an estimated engine angular velocity determined from the power train model, a clutch angular velocity error of the first clutch, which is a difference between a measured clutch angular velocity of the first clutch and an estimated clutch angular velocity of the first clutch determined from the power train model, a clutch angular velocity error of the second clutch, which is a difference between a measured clutch angular velocity of the second clutch and an estimated clutch angular velocity of the second clutch determined from the power train model, and a wheel angular velocity error, which is a difference between a measured wheel angular velocity and an estimated wheel angular velocity determined from the power train model and correcting the power train model in real time; and
   determining, by the controller, the power train model and estimating a clutch torque of the first clutch and a clutch torque of the second clutch.

3. The method of claim 2, wherein the power train model includes:
   an engine model determined according to engine dynamics;

a first clutch model and a second clutch model determined according to clutch dynamics; and a vehicle model determined according to vehicle dynamics.

4. The method of claim 3, wherein the model engine torque is input to the power train model with an estimated engine torque error determined by cumulatively integrating the engine angular velocity error.

5. The method of claim 4, wherein the target clutch torque of the first clutch is multiplied by a clutch characteristic variable of the first clutch determined by a clutch frictional force characteristic model of the first clutch and is input to the power train model, and wherein the target clutch torque of the second clutch is multiplied by a clutch characteristic variable of the second clutch determined by a clutch frictional force characteristic model of the second clutch and is input to the power train model.

6. The method of claim 5, wherein the engine model is expressed as:

$$J_e \dot{\hat{\omega}}_e = T_{e0} + \hat{\delta}_e - \hat{\mu}_{c1} T_{tc1} - \hat{\mu}_{c2} T_{tc2},$$

wherein $J_e$: engine moment of inertia $\dot{\hat{\omega}}_e$: estimated engine angular acceleration $T_{e0}$: model engine torque $\hat{\delta}_e$: estimated engine torque error $\hat{\mu}_{c1}$: clutch characteristic variable of first clutch $T_{tc1}$: target clutch torque of first clutch $\hat{\mu}_{c1} T_{tc1}$: clutch torque of first clutch $\hat{\mu}_{c2}$: clutch characteristic variable of second clutch $T_{tc2}$: target clutch torque of second clutch, and $\hat{\mu}_{c2} T_{tc2}$: clutch torque of second clutch.

7. The method of claim 5, wherein the first clutch model is expressed as:

$$J'_{c1} \dot{\hat{\omega}}_{c1} = \hat{\mu}_{c1} T_{tc1} + \frac{\gamma_T(\varphi_e)}{\gamma_T(\varphi_o)} \hat{\mu}_{c2} T_{tc2} - \frac{T_{so}(\hat{\omega}_{c1}, \hat{\omega}_w)}{\gamma_T(\varphi_o)}$$

wherein $J'_{c1}$: equivalent moment of inertia of first clutch $\dot{\hat{\omega}}_{c1}$: estimated clutch angular acceleration of first clutch $\hat{\mu}_{c1}$: clutch characteristic variable of first clutch $T_{tc1}$: target clutch torque of first clutch $\hat{\mu}_{c1} T_{tc1}$: clutch torque of first clutch $\hat{\mu}_{c2}$: clutch characteristic variable of second clutch $T_{tc2}$: target clutch torque of second clutch $\hat{\mu}_{c2} T_{tc2}$: clutch torque of second clutch $\varphi_e$: even-numbered gear stages $\varphi_o$: odd-numbered gear stages $\gamma_T(\varphi_e)$: gear ratio in gear stage $\varphi_e$ $\gamma_T(\varphi_o)$: gear ratio in gear stage $\varphi_o$ $\hat{\omega}_w$: estimated wheel angular velocity $T_{so}(\hat{\omega}_{c1}, \hat{\omega}_w)$: driveshaft torsional torque at the time of engaging odd-numbered stage, and $$T_{so}(\hat{\omega}_{c1}, \hat{\omega}_w) = \int_0^\tau k_s \left( \frac{\hat{\omega}_{c1}}{\gamma_T(\varphi_o)} - \hat{\omega}_w \right) d\tau - b_s \left( \frac{\hat{\omega}_{c1}}{\gamma_T(\varphi_o)} - \hat{\omega}_w \right)$$

$k_s$: rigidity coefficient of driveshaft $b_s$: damping coefficient of driveshaft, and $\hat{\omega}_{c1}$: estimated clutch angular velocity of first clutch.

8. The method of claim 5, wherein the second clutch model is expressed as:

$$J'_{c2} \dot{\hat{\omega}}_{c2} = \hat{\mu}_{c2} T_{tc2} + \frac{\gamma_T(\varphi_o)}{\gamma_T(\varphi_e)} \hat{\mu}_{c1} T_{tc1} - \frac{T_{se}(\hat{\omega}_{c2}, \hat{\omega}_w)}{\gamma_T(\varphi_e)}$$

wherein $J'_{c2}$: equivalent moment of inertia of second clutch $\dot{\hat{\omega}}_{c2}$: estimated clutch angular acceleration of second clutch $\hat{\mu}_{c1}$: clutch characteristic variable of first clutch $T_{tc1}$: target clutch torque of first clutch $\hat{\mu}_{c1} T_{tc1}$: clutch torque of first clutch $\hat{\mu}_{c2}$: clutch characteristic variable of second clutch $T_{tc2}$: target clutch torque of second clutch $\hat{\mu}_{c2} T_{tc2}$: clutch torque of second clutch $\varphi_e$: even-numbered gear stages $\varphi_o$: odd-numbered gear stages $\gamma_T(\varphi_e)$: gear ratio in gear stage $\varphi_e$ $\gamma_T(\varphi_o)$: gear ratio in gear stage $\varphi_o$ $\hat{\omega}_w$: estimated wheel angular velocity $T_{se}(\hat{\omega}_{c2}, \hat{\omega}_w)$: Driveshaft torsional torque at the time of engaging even-numbered stage, and $$T_{se}(\hat{\omega}_{c2}, \hat{\omega}_w) = \int_0^\tau k_s \left( \frac{\hat{\omega}_{c2}}{\gamma_T(\varphi_e)} - \hat{\omega}_w \right) d\tau - b_s \left( \frac{\hat{\omega}_{c2}}{\gamma_T(\varphi_e)} - \hat{\omega}_w \right)$$

$k_s$: rigidity coefficient of driveshaft $b_s$: damping coefficient of driveshaft, and $\hat{\omega}_{c2}$: estimated clutch angular velocity of second clutch.

9. The method of claim 5, wherein the vehicle model is expressed as:

$$J_v \dot{\hat{\omega}}_w = T_{sn}(\hat{\omega}_{ci}, \hat{\omega}_w) - T_L(\hat{\omega}_w)$$

wherein $J_v$: equivalent moment of inertia of vehicle $\dot{\hat{\omega}}_w$: estimated wheel angular acceleration $T_{sn}(\hat{\omega}_{ci}, \hat{\omega}_w)$: wherein $T_{sn}(\hat{\omega}_{c1}, \hat{\omega}_w)$ is $T_{so}(\hat{\omega}_{c1}, \hat{\omega}_w)$ at the time of engaging odd-numbered stage, and $T_{sn}(\hat{\omega}_{c2}, \hat{\omega}_w)$ is $T_{se}(\hat{\omega}_{c2}, \hat{\omega}_w)$ at the time of engaging even-numbered stage, $$T_{so}(\hat{\omega}_{c1}, \hat{\omega}_w) = \int_0^\tau k_s \left( \frac{\hat{\omega}_{c1}}{\gamma_T(\varphi_o)} - \hat{\omega}_w \right) d\tau - b_s \left( \frac{\hat{\omega}_{c1}}{\gamma_T(\varphi_o)} - \hat{\omega}_w \right)$$

$T_{so}$: driveshaft torsional torque at the time of engaging odd-numbered stage $\hat{\omega}_{c1}$: estimated clutch angular velocity of first clutch $\hat{\omega}_w$: estimated wheel angular velocity $k_s$: rigidity coefficient of driveshaft $b_s$: damping coefficient of driveshaft $\omega_{c1}$: measured clutch angular velocity of first clutch $\varphi_o$: odd-numbered gear stages $\gamma_T(\varphi_o)$: gear ratio in gear stage $\varphi_o$ $$T_{se}(\hat{\omega}_{c2}, \hat{\omega}_w) = \int_0^t k_s\left(\frac{\hat{\omega}_{c2}}{\gamma_T(\varphi_e)} - \hat{\omega}_w\right)d\tau - b_s\left(\frac{\hat{\omega}_{c2}}{\gamma_T(\varphi_e)} - \hat{\omega}_w\right)$$

$T_{se}$: driveshaft torsional torque at the time of engaging even-numbered stage
$\hat{\omega}_{c2}$: estimated clutch angular velocity of second clutch
$\omega_{c2}$: measured clutch angular velocity of second clutch
$\varphi_e$: even-numbered gear stages
$\gamma_T(\varphi_e)$: gear ratio in gear stage $\varphi_e$, and
$T_L(\omega_w)$: vehicle load.

10. The method of claim 5, wherein the clutch frictional force characteristic model of the first clutch is expressed as:

$$\hat{\mu}_{c1}(\hat{\omega}_{s1}, \hat{Z}_{c1}) = \sigma_{c10}\hat{z}_{c1} + \sigma_{c11}\dot{\hat{z}}_{c1} + \sigma_{c12}\hat{\omega}_{s1}$$

wherein $$\hat{\omega}_{s1} = \hat{\omega}_e - \hat{\omega}_{c1},$$

$$\dot{\hat{z}}_{c1} = \hat{\omega}_{s1} - \sigma_{c10}\frac{|\hat{\omega}_{s1}|}{g(\hat{\omega}_{s1})}\hat{z}_{c1},$$

$\hat{\mu}_{c1}$: clutch characteristic variable of first clutch
$\hat{\omega}_{s1}$: estimated clutch slip of first clutch
$\hat{\omega}_e$: estimated engine angular velocity
$\hat{\omega}_{c1}$: estimated clutch angular velocity of first clutch
$\sigma_{c10}$: rigidity coefficient for internal frictional force of first clutch
$\sigma_{c11}$: damping coefficient for internal frictional force of first clutch
$\sigma_{c12}$: damping coefficient for slip of first clutch
$z_{c1}$: internal variable for determining frictional force of first clutch and $\hat{z}_{c1}$: estimated value of $z_{c1}$
$g(\hat{\omega}_{s1})$: $z_{c1}$ frictional force according to slip of first clutch when change of $z_{c1}$ is 0

$$g(\hat{\omega}_{s1}) = f_{c1c} + (f_{c1s} - f_{c1c})e^{-(\omega_{s1}/\omega_{cs})^2}$$

$f_{c1c}$: coefficient of kinetic friction of first clutch
$f_{c1s}$: coefficient of static friction of first clutch, and
$\omega_{cs}$: critical slip velocity.

11. The method of claim 5, wherein the clutch frictional force characteristic model of the second clutch is expressed as:

$$\hat{\mu}_{c2}(\hat{\omega}_{s2}, \hat{z}_{c2}) = \sigma_{c20}\hat{z}_{c2} + \sigma_{c21}\dot{\hat{z}}_{c1} + \sigma_{c22}\hat{\omega}_{s2}$$

wherein $$\hat{\omega}_{s2} = \hat{\omega}_e - \hat{\omega}_{c2},$$

$$\dot{\hat{z}}_{c2} = \hat{\omega}_{s2} - \sigma_{c20}\frac{|\hat{\omega}_{s2}|}{g(\hat{\omega}_{s2})}\hat{z}_{c2},$$

$\hat{\mu}_{c2}$: clutch characteristic variable of second clutch
$\hat{\omega}_{s2}$: estimated clutch slip of second clutch
$\hat{\omega}_e$: estimated engine angular velocity
$\hat{\omega}_{c2}$: estimated clutch angular velocity of second clutch
$\sigma_{c20}$: rigidity coefficient for internal frictional force of second clutch
$\sigma_{c21}$: damping coefficient for internal frictional force of second clutch
$\sigma_{c22}$: damping coefficient for slip of second clutch
$z_{c2}$: internal variable for determining frictional force of second clutch and $\hat{z}_{c2}$: estimated value of $z_{c2}$
$g(\hat{\omega}_{s2})$: frictional force according to slip of second clutch when change of $z_{c2}$ is 0

$$g(\hat{\omega}_{s2}) = f_{c2c} + (f_{c2s} - f_{c2c})e^{-(\omega_{s2}/\omega_{cs})^2}$$

$f_{c2c}$: coefficient of kinetic friction of second clutch
$f_{c2s}$: coefficient of static friction of second clutch, and
$\omega_{cs}$: critical slip velocity.

12. The method of claim 1, wherein the predetermined reference torque is set in consideration of an engine torque error, a clutch torque error, and an observer modeling error.

13. The method of claim 12, wherein the predetermined reference torque is set to a value obtained by adding an overcomable torque which is overcomable by a feedback control of the clutch torque to a root mean square of the engine torque error, the clutch torque error, and the observer modeling error.

* * * * *